Oct. 31, 1961  A. B. BERGH ET AL  3,007,106
CURRENT METER AND PROBE THEREFOR
Filed July 25, 1958  2 Sheets-Sheet 1
FIG_1_
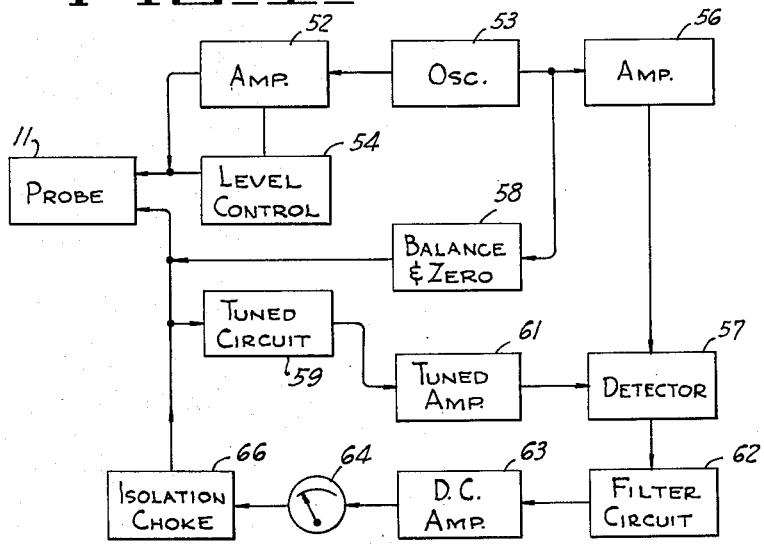
FIG_2_
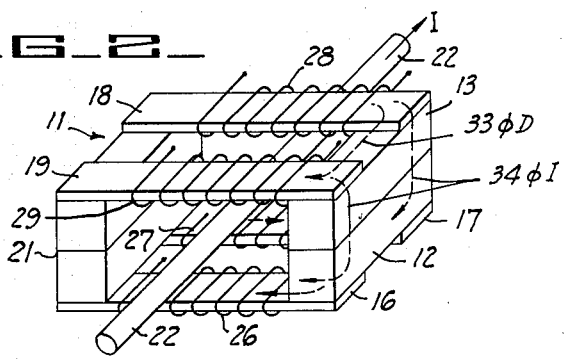
FIG_3_
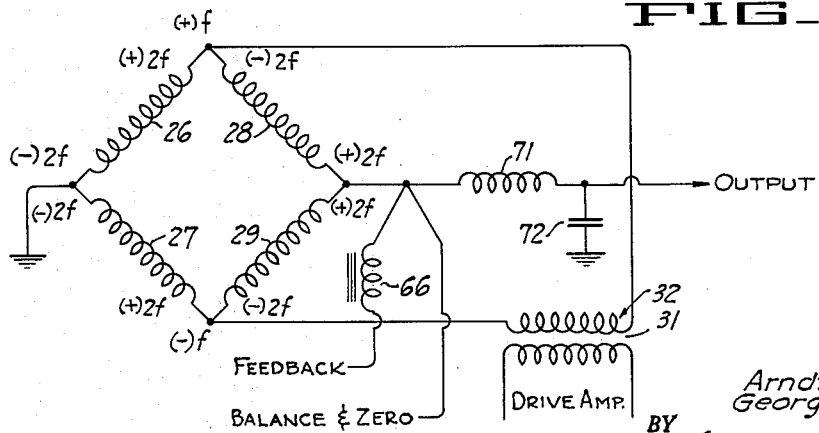
INVENTORS
Arndt B. Bergh
George S. Kan
BY
ATTORNEYS

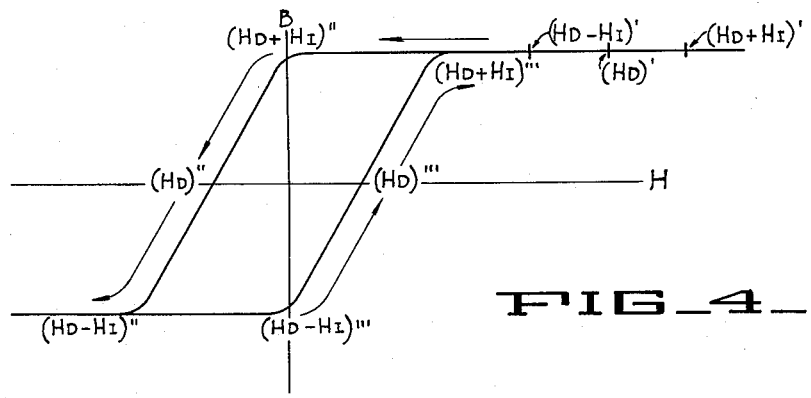
FIG_4_
FIG_5_
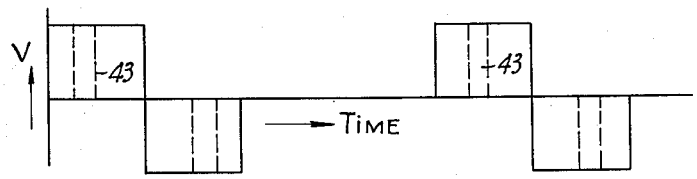
FIG_6_
FIG_7_
FIG_8_
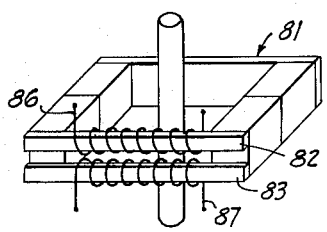
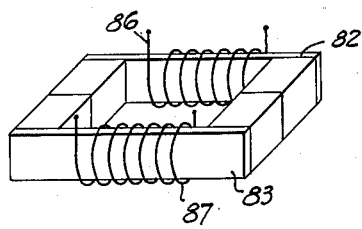
FIG_9_
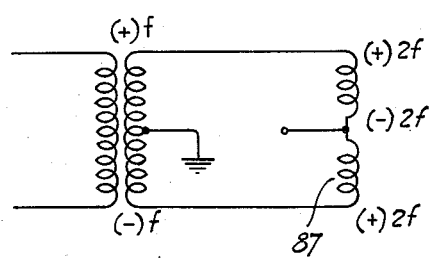
INVENTORS
Arndt B. Bergh
George S. Kan
BY
ATTORNEYS United States Patent Office 3,007,106
Patented Oct. 31, 1961

3,007,106
CURRENT METER AND PROBE THEREFOR
Arndt B. Bergh and George S. Kan, Palo Alto, Calif., assignors to Hewlett-Packard Company, Palo Alto, Calif., a corporation of California
Filed July 25, 1958, Ser. No. 751,017
5 Claims. (Cl. 323—75)

This invention relates generally to a current meter and probe therefor, and the more particularly to a current meter and probe which measures current by measuring the magnetic field set up by the current.

Current is usually measured either directly with the use of a moving coil type current meter or indirectly by measuring the voltage drop across a known resistance. Each of these methods has disadvantages. In a moving coil type meter the conductor in which the current is to be measured must be opened and the meter connected in series. This is inconvenient. Thus, the technician or engineer will often forego a current measurement. In the indirect method the voltage drop is often taken across a resistor which has a tolerance of five or ten percent. The current indication has the same inaccuracy.

With the increase in use of low impedance circuits, for example, transistors circuits, where current is an important parameter more suitable methods of measuring currents are required. Both methods introduce excessive resistance in this type of circuit.

It is a general object of the present invention to provide an improved current meter.

It is a further object of the present invention to provide a current meter which introduces negligible resistance in the circuit with which it is associated.

It is still a further object of the present invention to provide a meter which senses current by sensing the magnetic field set up thereby.

It is a further object of the present invention to provide an improved sensing head for meters of the above character.

It is another object of the present invention to provide an improved sensing probe for meters of the above character which is relatively immune to homogeneous and inhomogeneous external fields.

It is another object of the present invention to provide a probe which includes a core having windings which both serve to excite the core and to develop an output signal.

These and other objects of the invention will become more clearly apparent from the following description when taken in conjunction with the accompanying drawings:

Referring to the drawings:

FIGURE 1 is a schematic block diagram of a current meter in accordance with the invention;

FIGURE 2 is a schematic diagram of a sensing probe for use with the meter of FIGURE 1;

FIGURE 3 is a schematic diagram of the electrical connections to the head;

FIGURE 4 is a B-H plot to facilitate understanding of the operation of the sensing probe;

FIGURE 5 shows magnitizing force as a function of time;

FIGURE 6 shows induced output voltage as a function of time;

FIGURE 7 shows another sensing head;

FIGURE 8 shows still another sensing head configuration; and

FIGURE 9 is a schematic diagram of the electrical connections to the heads of FIGURES 7 and 8.

Generally the current meter operates by sensing the magnetic field produced by the current being measured. A probe, FIGURE 2, is adapted to be coupled to the magnetic fields surrounding the conductor which carries the current to be measured. The probe is provided with windings which are excited at a fundamental frequency and which produce an A.-C. output voltage of twice or higher even harmonics of the exciting frequency. The output voltage is proportional to the magnetic flux produced by the current being measured. The output signal is amplified and applied to a phase sensitive detector whose output in turn feeds an indicating meter. The overall system is stabilized by the use of negative feedback.

Referring to FIGURE 2, the probe includes a core of magnetic material 11 having end portions 12 and 13 and leg portions 16, 17, 18, and 19 which magnetically connect the end portions. The end portions 12 and 13 are split at 21 whereby the core 11 can be opened to receive a current carrying conductor 22.

The leg portions 16–19 carry windings 26–29 respectively. The windings may be connected in a bridge circuit, FIGURE 3 having four terminals. The bridge is excited across a pair of terminals by the secondary 31 of transformer 32. The output signal is obtained across the other pair of terminals.

Referring to FIGURE 2 the flux line 33 represents the flux set up by the excitation voltage. The flux lines 34 represent the flux set up by the current I flowing in the conductor 22. These fluxes are hereinafter referred to as $\phi_D$ and $\phi_I$ respectively. The flux encircling the windings 26 and 27 is in similar direction and is similarly identified. It is noted that in one leg of each pair of windings 26, 27 and 28, 29 the flux $\phi_D$ and $\phi_I$ is aiding while in the other leg of each pair of windings the flux $\phi_D$ and $\phi_I$ is opposing.

The connections to the bridge circuits are such that the instantaneous voltage polarities indicated in FIGURE 3 prevail. Thus, the upper terminal of the bridge circuit is instantaneously positive at the fundamental frequency indicated by $(+)f$. The polarity for the harmonic frequency is given by $(+)2f$ at this terminal for the windings 26 and $(-)2f$ for the winding 28. Similar representations are applied to the other bridge terminals. Thus the lower bridge terminal has the instantaneous polarities $(-)f$, $(-)2f$ for winding 29 and $(+)2f$ for winding 27. The right hand terminal has instantaneous polarities $(+)2f$, $(-)f$ for winding 28, $(+)f$ for winding 29. The left hand terminal has the instantaneous polarities $(-)2f$, $(-)f$ for winding 26 and $(+)f$ for winding 27.

Operation of the head to generate the output voltage of harmonic frequency may be more clearly understood with the reference to FIGURES 4, 5, and 6. Referring to FIGURE 4 a typical B-H curve for the magnetic core is illustrated. Regarding the flux on either pair of windings 26, 27 or 28, 29 the magnetizing force on one winding is given by $(H_D-H_I)'$ and on the other winding $(H_D+H_I)'$ where $H_D$ represents the magnetizing force due to the driving voltage and $H_I$ the magnetizing force due to the current flowing in the conductor 22. After a period of time the magnetizing forces are as represented by $(H_D-H_I)''$ and $(H_D+H_I)''$, and then by the magnetizing forces represented by $(H_D-H_I)'''$ and $(H_D+H_I)'''$. Upon completion of one fundamental cycle the conditions are as originally indicated.

If the coils are connected whereby the magnetizing forces are subtractive then the following conditions will prevail for $2H_I$ equal to saturation magnetizing force:
(1) In the position represented by the primes the difference in B is zero, the zero point of the curve of FIGURE 5. (2) In the position represented by the double prime the difference in B is 2B represented by the peak 38 and,
(3) the condition represented by triple prime where the difference is again 2B. It is therefore noted that the flux difference is zero when the core is saturated and it increases to 2B two times for each cycle of the driving voltage. If $H_I$ is less than the value where $2H_I$ equals saturation magnetizing force the maximum flux density does not increase to 2B but reaches some value between zero and 2B. The dotted curve 45 in the figure represents one such condition. Here the flux increases from zero to a value represented by $2H_I$ for the particular condition and remains constant for a period of time and then returns to zero. This also occurs twice for each cycle of the driving voltage.

The flux will induce voltages of the type shown in FIGURE 6 which are squarewave voltages having a component of two times the fundamental frequency. It is seen that the average value of the induced voltage is dependent only on $H_I$ which in turn is dependent upon the current flowing in the conductor.

By connecting the windings in the manner indicated the same set of windings serve to provide the exciting magnetizing force $H_D$ and to provide the output voltage which is dependent on I, ($H_I$). The output voltage is two times the voltage induced in any pair.

The circuit of FIGURE 1 is suitable for exciting the core and for detecting the second harmonic voltage and providing an output signal to a meter for indicating the current flowing in the conductor 22. The probe 11 is excited by an amplifier 52 which is fed by an oscillator 53. A level control 54 may be provided for maintaining a constant drive amplitude. The oscillator also provides an output of two times the fundamental frequency to an amplifier 56 which supplies a signal to the phase sensitive detector 57.

The second harmonic signal is also applied to a balance and a zero control 58. The balance and zero control serves to provide signals, which have a zero and 90° phase relationship, to the output terminals of the probe. These signals are employed to zero the apparatus, that is to compensate for residual magnetism in the head and to provide for zero set on the meter.

The output voltage is applied to a tuned circuit 59 which is tuned to the harmonic frequency. The output of the filter is amplified by amplifier 61 and applied to the phase sensitive detector 57.

The phase sensitive detector serves to detect the signal voltage and provides a D.-C. output signal whose amplitude is proportional to the average value of the output voltage. This signal is applied to a filter circuit 62 and a D.-C. amplifier 63. The amplifier 63 drives an indicating meter 64. The D.-C. signal is also fed back into the apparatus through an isolation choke 66. The feedback is negative to stabilize operation of the meter.

Referring to FIGURE 3 connection to the probe is shown. The tuned circuit in the output comprises a series choke 71 and a shunt capacitor 72. The isolation choke 66 prevents the output signal from being coupled to the feedback circuits.

Referring to FIGURES 2 and 3 it is noted that any homogeneous field, such as the earth's magnetic field, will be coupled to all of the windings in the same sense. The connection of the windings in the bridge is such that voltages which are induced by homogeneous magnetic fields cancel.

Where the effects of homogeneous magnetic fields can be neglected a probe having a core with a single pair of windings may be employed. Referring to FIGURE 7 a suitable probe is illustrated. The probe includes a split core 81 having a pair of legs 82 and 83 which carry windings 86 and 87 respectively. It is also possible to provide a probe which is relatively immune to homogeneous field with a single set of windings. Such a probe is shown in FIGURE 8.

Referring to FIGURE 9 the connection of the windings for the probes of FIGURES 7 and 8 is illustrated. The secondary of the exciting transformer is center tapped with the tap grounded. The windings are connected in the sense indicated where the instantaneous polarity at the common terminal is the same, $(-)2f$.

The output voltage is available at the common terminal. The voltage is induced in the manner previously described. The remainder of the circuit is as previously described. It is again noted that the same windings are employed to excite the magnetic core and derive the output signal.

Thus there is provided a current meter which measures current by measuring the magnetic fields set up by the flow of current. The meter introduces no resistance into the circuit under test and negligible inductance. The same set of probe windings are employed for exciting the probe, zeroing and balancing the probe and for deriving an output signal.

We claim:

1. In a current meter for measuring current flowing through a conductor, a probe head having a magnetic core adapted to encircle said conductor, said core comprising left and right end portions, each end portion being split into upper and lower sections so as to allow the introduction of said conductor between said end portions, a pair of legs connecting said upper sections and forming together with said upper sections a closed upper magnetic path, a pair of legs connecting said lower sections and forming together with said lower sections a closed lower magnetic path, a winding on each of said legs, the windings on said upper magnetic path being connected whereby the fluxes through said upper magnetic path due to the current through said windings are aiding, the windings on said lower magnetic path being connected whereby the fluxes through said lower magnetic path due to current through said windings are aiding, and means connecting the windings of said upper and lower magnetic paths in a bridge circuit.

2. In a current meter for measuring current flowing through a conductor, a probe head having a magnetic core adapted to encircle said conductor, said core comprising left and right end portions, each end portion being split into upper and lower sections so as to allow the introduction of said conductor between said end portions, a pair of legs of saturable magnetic material connecting said upper sections and forming together with said upper sections a closed upper magnetic path, a pair of legs of saturable magnetic material connecting said lower sections and forming together with said lower sections a closed lower magnetic path, a winding on each of said legs, the windings on said upper magnetic path being connected whereby the fluxes through said upper magnetic path due to the current through said windings are aiding, the windings on said lower magnetic path being connected whereby the fluxes through said lower magnetic path due to current through said windings are aiding, and means connecting the windings of said upper and lower magnetic paths in a bridge circuit.

3. In a current meter for measuring current flowing through a conductor, a probe head having a magnetic core adapted to encircle said conductor, said core comprising left and right end portions, each end portion being split into upper and lower sections so as to form a gap to allow the introduction of said conductor between said end portions, a pair of legs connecting said upper sections and forming together with said upper sections a closed upper magnetic path, a pair of legs connecting said lower sections and forming together with said lower sections a closed lower magnetic path, a winding on each of said legs, the windings on said upper and lower magnetic paths being connected whereby the fluxes through said upper and lower magnetic paths due to the current through said windings do not cross said gap, and means connecting the windings of said upper and lower magnetic paths in a bridge circuit.

4. In a current meter for measuring current flowing through a conductor, a probe head having a magnetic core adapted to encircle said conductor, said core comprising left and right end portions, each end portion being split into upper and lower sections so as to allow the introduction of said conductor between said end portions, a pair of legs of saturable material connecting said upper sections and forming together with said upper sections a closed upper magnetic path, magnetic path means connecting lower sections, a winding on each of said legs so connected that the fluxes through said upper magnetic path due to the current through said windings are aiding, and means connecting said windings in a bridge circuit.

5. In a current meter for measuring current flowing through a conductor, a probe head having a magnetic core adapted to encircle said conductor, said core comprising left and right end portions, each end portion being split into upper and lower sections so as to allow the introduction of said conductor between said end portions, at least one leg of saturable material connecting said upper sections and forming a separate upper magnetic path, at least one leg of saturable material connecting said lower sections and forming a separate lower magnetic path, a winding on each of said legs, the windings on said upper and lower magnetic paths being so connected that the flux through said upper magnetic path due to the current through said winding and the flux through said lower magnetic path due to current through said other winding cancel out in said end portions, and means connecting the winding of said upper and lower magnetic paths in a bridge circuit.

References Cited in the file of this patent
UNITED STATES PATENTS

| | | |
|---|---|---|
| 750,525 | Everest | Jan. 26, 1904 |
| 2,272,772 | Hathaway | Feb. 10, 1942 |
| 2,605,302 | Specht | July 29, 1952 |
| 2,632,883 | Richardson | Mar. 24, 1953 |
| 2,760,158 | Kerns | Aug. 21, 1956 |